(12) United States Patent
Forman et al.

(10) Patent No.: US 8,398,085 B2
(45) Date of Patent: Mar. 19, 2013

(54) CARD TRADE SYSTEM AND METHODS THEREOF

(75) Inventors: David Forman, Rancho Mirage, CA (US); Rick White, Rancho Mirage, CA (US)

(73) Assignee: Planet Bingo, Inc., Palm Desert, CA (US)

( * ) Notice: Subject to any disclaimer, the term of this patent is extended or adjusted under 35 U.S.C. 154(b) by 0 days.

(21) Appl. No.: 13/365,023

(22) Filed: Feb. 2, 2012

(65) Prior Publication Data

US 2013/0045786 A1 Feb. 21, 2013

Related U.S. Application Data

(60) Provisional application No. 61/525,632, filed on Aug. 19, 2011.

(51) Int. Cl.
*A63F 1/00* (2006.01)
(52) U.S. Cl. .......................................... 273/292; 463/19
(58) Field of Classification Search .............. 273/138 R, 273/292, 191–192; 463/16–25
See application file for complete search history.

(56) References Cited

U.S. PATENT DOCUMENTS

| | | | | |
|---|---|---|---|---|
| 5,230,514 | A * | 7/1993 | Frain | 273/237 |
| 6,446,972 | B1 * | 9/2002 | Brunelle | 273/292 |
| 7,481,707 | B1 * | 1/2009 | Luciano et al. | 463/19 |
| 2006/0087082 | A1 * | 4/2006 | Ko | 273/292 |
| 2010/0167802 | A1 * | 7/2010 | Walker et al. | 463/11 |

* cited by examiner

*Primary Examiner* — Masud Ahmed
(74) *Attorney, Agent, or Firm* — Weiss & Moy, P.C.; Jeffrey D. Moy

(57) ABSTRACT

A Bingo card trade feature is disclosed. This feature can offer players the option to trade one set of Bingo cards for another set of different Bingo cards. This exchange can cost nothing or an additional preset cost. These trades can be established through the entity hosting the game. The traded cards can be available for further trades for the same Bingo game based on the business rule set by the entity. The players can be able to trade cards up until a specified time before the start of the actual game. The players can also be able to trade a card as many times as they wish depending on their budget. In one specific example, a "Bonanza Trade" can offer the player the ability to take a daubed Bonanza card that was purchased, add a dollar and get two new Bonanza cards in exchange.

18 Claims, 6 Drawing Sheets

CARD TRADE SYSTEM AND METHODS THEREOF

REFERENCE TO RELATED APPLICATIONS

This disclosure claims priority to U.S. Provisional Application Ser. No. 61/525,632 titled CARD TRADE SYSTEM AND METHOD that was filed on Aug. 19, 2011 by David Forman and Rick White, which is hereby incorporated by reference in its entirety.

TECHNICAL FIELD

This disclosure generally relates to games, and more particularly, to a networked gaming system that allows player units operating client software to trade Bingo game cards.

BACKGROUND

Bingo is a game of chance. Played with randomly drawn numbers, Bingo matches these numbers against a set of numbers that have been provided on a 5×5 matrix. These matrices can be printed on paper, card stock or electronically represented and are referred to as cards. Many versions conclude the game when the first person achieves a specified pattern from the drawn numbers. The winner is usually required to call out the word "Bingo!", which alerts the other players and caller of a possible win.

Bonanza Bingo, a variation of standard Bingo, begins with 45 pre-drawn numbers. In some embodiments, odd numbers or even numbers are called. These numbers are posted on a Bonanza board or a standard flashboard or video flash board. Bonanza cards for these variations of Bonanza cards are sold until the beginning of the game. The player that covers their entire card wins the jackpot. When there is no winner, numbers are continuously called until a consolation prize is won. This increases the player's chances, which increases excitement and adds to player spending.

Computers have been used to play Bingo and variations thereof. Nevertheless, a networked platform has not been designed for players to compete against one another for a prize or jackpot while providing the flexibility of replacing or purchasing additional cards for these games. A need therefore exists for a card trade system and methods thereof that overcome these, as well as other related, challenges.

SUMMARY

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a game server is provided. The game server can include at least one processor and a database for storing a plurality of electronic bingo cards. In addition, the game server can include memory operatively coupled to the at least one processor. The memory can store program instructions that when executed by the at least one processor causes the processor to provide at least one electronic bingo card to a player unit and receive a trade request from the player unit. In addition, the processor can validate the trade request and provide at least one new electronic bingo card to the player unit when validated. The processor can also mark the at least one new electronic bingo card within the database precluding other player units from accessing the at least one new electronic bingo card.

In accordance with another aspect of the present disclosure, a method for trading Bonanza Bingo game cards through a graphical user interface (GUI) of a display screen is provided. The method can include displaying at least one Bonanza Bingo game card from a game server on the GUI and requesting at least one new Bonanza Bingo game card from the server. In addition, the method can include providing account information to the server and receiving the at least one new Bonanza Bingo game card from the server when the server validates the account information. The method can also include displaying the at least one new Bonanza Bingo game card on the GUI.

In accordance with yet another aspect of the present application, a system is provided. The system can include at least one user agent playing at least one Bonanza Bingo game card. In addition, the system can include a game server connected to the at least one user agent providing the at least one Bonanza Bingo game card. The game server can receive a request for at least one new Bonanza Bingo game card, authenticate the at least one user agent and provide the at least one new Bonanza Bingo game card to the at least one user agent.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to games. More specifically, this disclosure relates to a card trade system and methods thereof. In one illustrative embodiment, a "Bonanza Trade" feature can be provided. This feature can offer players the option to trade one set of Bingo cards for another set of different Bingo cards. Typically, this exchange can cost nothing or be an additional preset cost. These trades can be established through the entity hosting the game, for example, the Bingo hall, casino or charity. The traded cards can be available for further trades for the same Bonanza game based on the business rule set by the entity. The players can be able to trade Bonanza cards up until a specified time before the start of the actual Bonanza game. The players can also be able to trade a Bonanza card as many times as they wish depending on their budget. In one specific example, a "Bonanza Trade" can offer the player the ability to take a daubed Bonanza card that was purchased, add a dollar and get two new Bonanza cards in exchange. Generally, the traded cards are not reusable for the same game.

A number of advantages can be offered by the illustrative embodiment described above. The card trade system can provide a networked interface allowing players to change their current cards without repeating any played matrices. A player can also trade in their cards that do not contain their lucky number, for example, 7. A player can trade their cards if they have one or more numbers that the player regards as unlucky, for example, 13. The player can be prompted as part of the trade-in process to enter the relevant desired or unwanted numbers. The system can also allow for a more exciting game among different parties located miles and miles apart. Additional revenue can be generated through the exchange of cards as shown above. Many additional advantages of the present disclosure will become apparent to those skilled in the relevant art as provided for in the following description.

Figure 1:
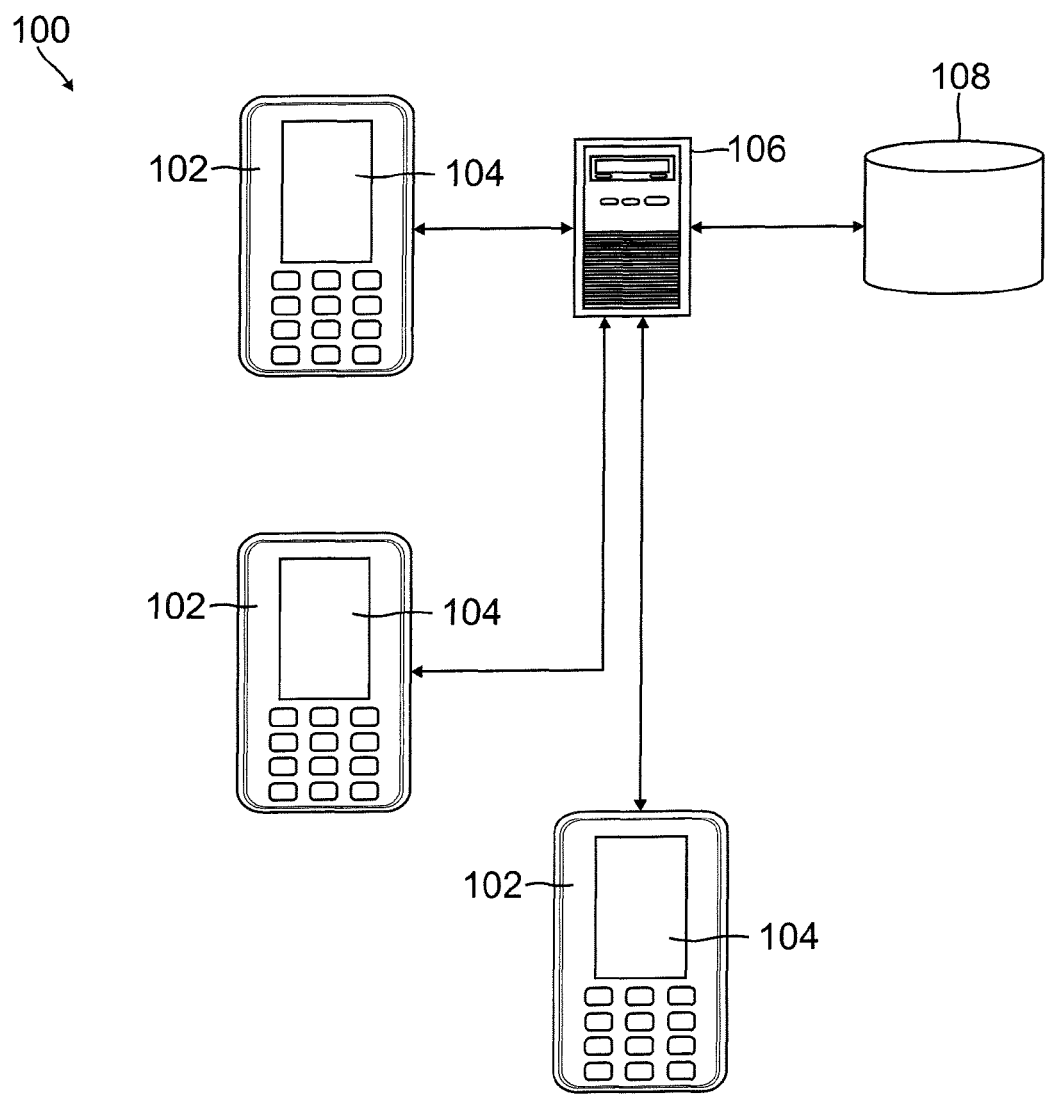
FIG. 1 is an exemplary environment for the card trade system and method in accordance with one or more aspects of the present disclosure.
Figure 2:
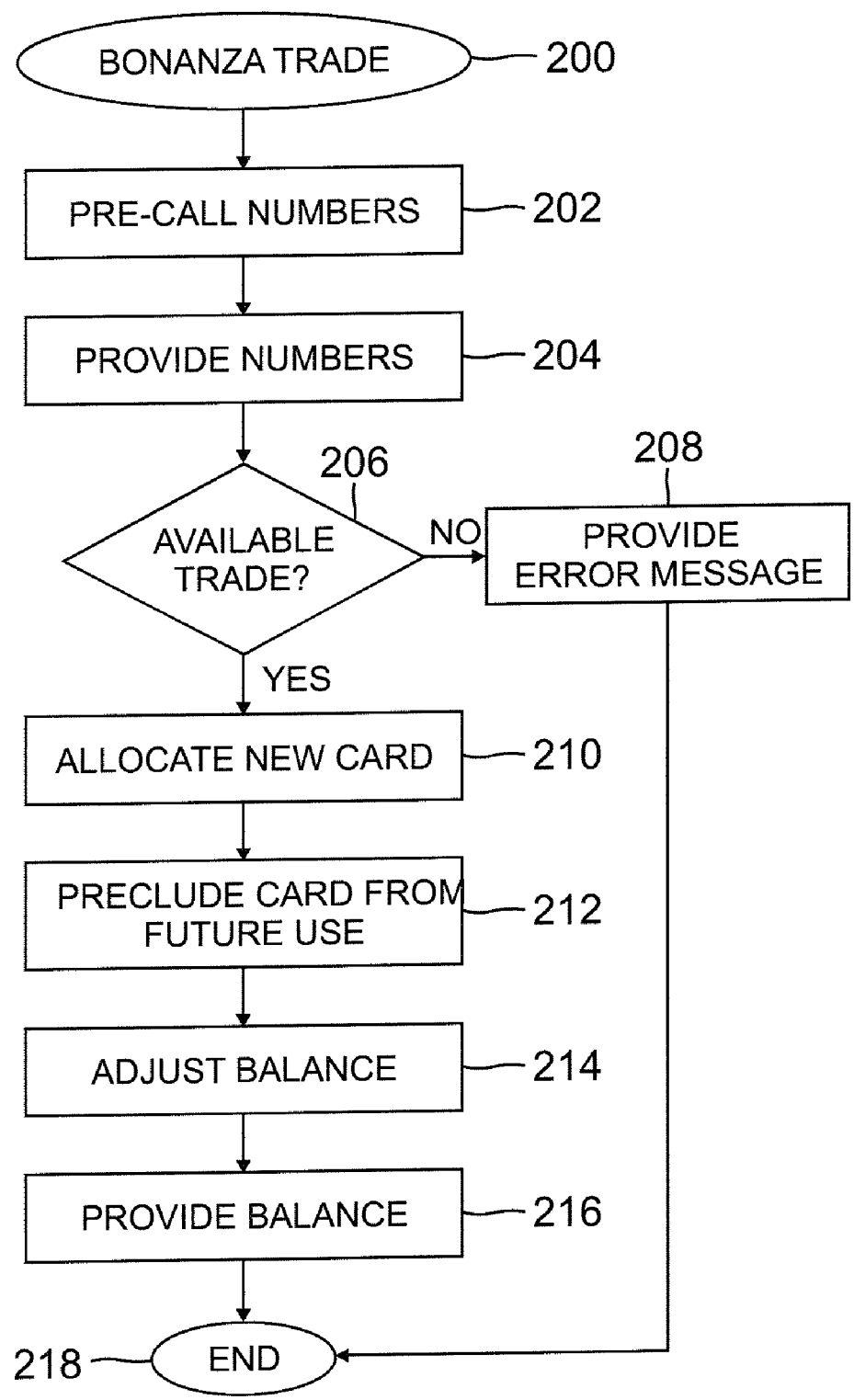
FIG. 2 is an illustrative flowchart depicting exemplary processes for trading cards within Bonanza Bingo in accordance with one or more aspects of the present disclosure.

An environment in which the card trade system can be used will be shown in FIG. 1. FIG. 2 then provides exemplary processes for a "Bonanza Trade". Different screen shots for the trade will be provided in FIGS. 3 through 6. While primarily described in Bonanza Bingo, the card trade system and methods thereof can be used in other games, for example, standard Bingo. The processes described herein can also be used for games that do not require pre-game calling of balls. It should also be noted that the present disclosure can be utilized for other games of chance, where a player is provided with an initial offering from a dealer or the house in the form of playing cards or the like, and where a player can have an opportunity to trade all or at least some portion of the player's initial offering before playing.

Turning to FIG. 1, an exemplary environment for the card trade system 100 and method in accordance with one or more aspects of the present disclosure is provided. Within the system 100, a plurality of player units 102, server 106 and database 108 configuration can be used. These components within the system 100 can communicate through a network. The components can be connected to the network, and thereby to each other, through logical connections. The network can include a local area network (LAN), wide area network (WAN), personal area network (PAN), campus area network (CAN), metropolitan area network (MAN), or global area network (GAN). Combinations of these networks can be used. Such networking environments are commonplace in office networks, enterprise-wide computer networks, intranets and the Internet, which are all types of networks.

A firewall can be provided within the card trade system 100 such that player units 102 are authorized before given access to communicate with the server 106 and database 108. The firewall can include a set of components designed to deny transmission of data to and from the server 106 while permitting legitimate communications to pass. Malicious programs can be prevented by the firewall from interfering with normal communications.

Continuing with FIG. 1, a number of player units 102 can be provided within the card trade system 100. Each player unit 102 can have a processor for implementing logic, a memory, a display and an input device. The memory generally includes both volatile memory, such as RAM, and non-volatile memory, such as ROM, flash memory, or the like. The non-volatile portion of the memory can be used to store persistent information which should not be lost when the player unit 102 is powered down. The client software 104 installed on the player unit 102 can interact with the server 106. The client software 104 can be used to process and prioritize incoming data as well as providing data.

The server 106 can be used to make trades for the player units 102. A traditional or web server 106 can be used. In one embodiment, the server 106 can include an operating system and software instructions, ROM, RAM, at least one processor, network interface and data storage. The server 106 can process requests from the player units 102 or any other component within the environment. The server 106 can typically handle high volumes of transactions and large amount of queries for communication and data processing. RAM and ROM are used to support the program codes that are operated by the processor. The memory can be in a form of a hard disk, CD ROM, or equivalent storage medium. The processor can support the authentications such as communications from external data servers, as well as allowing for anonymous transactions and general data encryption. Conventional Ethernet technology or internal or external modems can serve as the network interfaces. A cable or DSL modem can be used as a network interface. While the above embodiment describes a single computer system acting as the server 106, the functionality can be distributed over multiple computing systems.

The server 106 can be connected to a database 108. The database 108 can include information related to Bingo or Bonanza cards, for example, cards that have been previously used or are currently being played. The database 108 can also be distributed over a cloud computing environment known to those skilled in the relevant art. In one embodiment, the server 106 is configured in a distributed architecture, wherein the databases 108 and processors are housed in separate units or locations. Other known types of hardware can be used to implement the card trade system 100.

As shown in FIG. 1, the electronic/software implementation of the "Bonanza Trade" can involve multiple tiers. The front tier can be the client software 104 that resides on the player units 102, which can be fixed or portable. The middle tier can be the components residing on the server 106. The third tier can be the database 108. All the "Bonanza Trade" communications can take place using reliable TCP/IP with secured proprietary application level protocol which can ensure integrity of the messages, authenticity of the account and unit, accuracy of session and game number and availability of funds and cards. The messages can be request and response based.

The technology described herein can be implemented as logical operations and/or modules. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

FIG. 2 is an illustrative flowchart depicting exemplary processes for trading cards within Bonanza Bingo in accordance with one or more aspects of the present disclosure. Those skilled in the relevant art will appreciate that fewer or more processes can be used. The processes can begin at block 200. Cards can be distributed to the player units 102 by the server 106. The server 106 can randomly generate those cards and provide them to the player units 102. Alternatively, these cards can be established by the player. The server 106 can determine whether the cards and its indicia are available by searching through the database 108.

At block 202, the Bonanza numbers can be pre-called. Typically, the pre-called numbers can be determined on the server 106 of the card trade system 100. The pre-called numbers can then be sent at block 204, either through broadcast or multicast, to the player units 102. The messages can be sent out by the server 106 at a regular interval which enables the players to trade electronically any time within a permitted time window, generally before the game begins.

Figure 3:
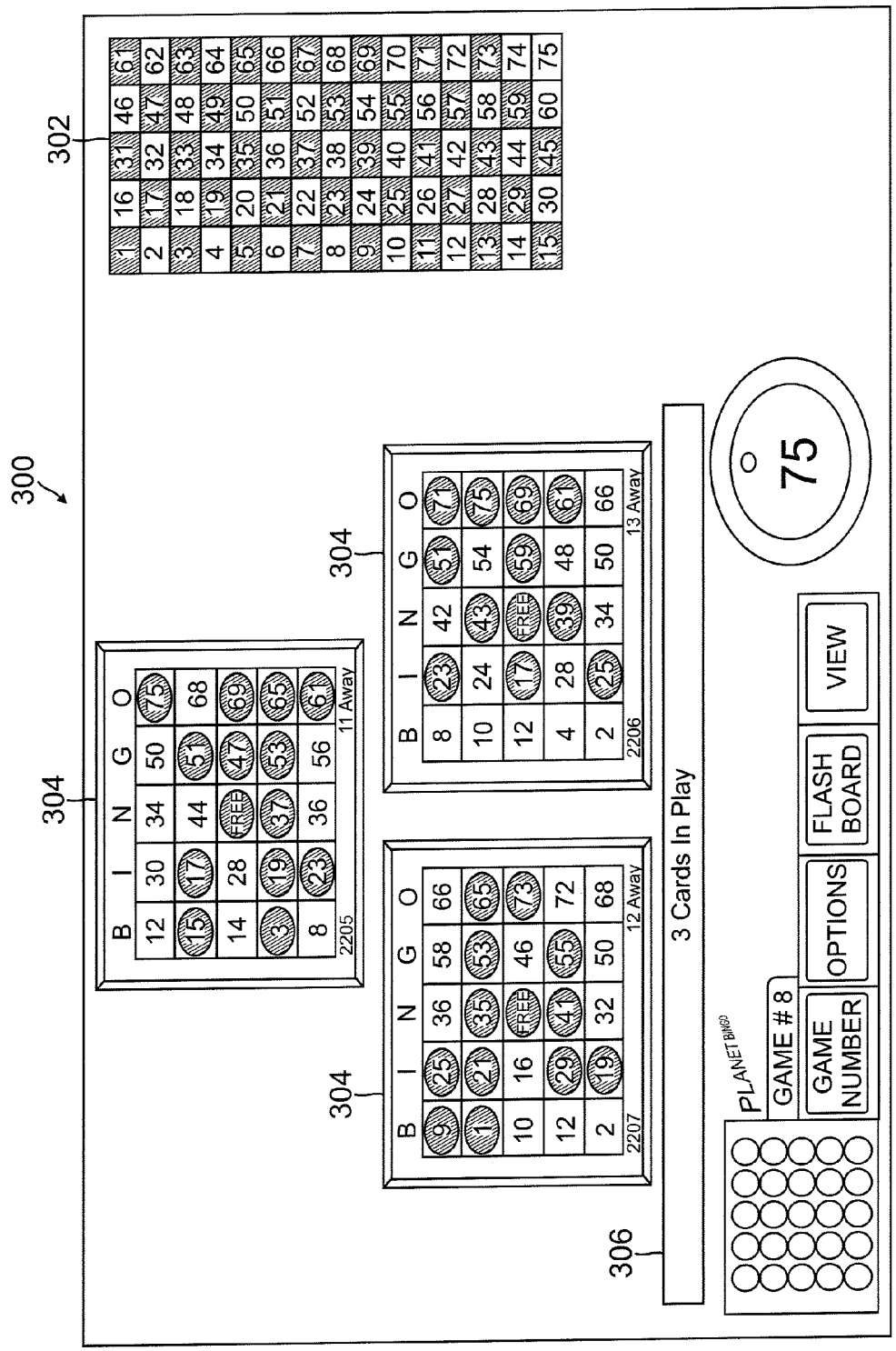
FIG. 3 is an exemplary screen shot provided when a trade is not available in accordance with one or more aspects of the present disclosure.

Once the player units 102 receive the pre-called numbers and the player has selected the Bonanza Game, a request message can be sent by the units 102 to the server 106 to determine availability of funds and whether a trade is available. At decision block 206, the server 106 can determine whether a trade is available. Typically, trades can be made during an authorized time window. If the trade is not available then an error message shows on the player unit 102 at block 208. The processes can end at block 218. FIG. 3 is an exemplary screen shot 300 provided when a trade is not available in accordance with one or more aspects of the present disclosure. Trades can fail for a variety of reasons. For example, a trade can fail from a lack of funds. A trade can also fail when the trade button is not defined or the Bonanza Game is not available. Other reasons can include that the Bonanza card has already been traded or it is not available for a trade. In one embodiment, no further permutations exist. The error messages can indicate the specific failure.

As shown in FIG. 3, the pre-drawn numbers can be displayed in a Bonanza board 302. The numbers that have been pre-drawn can be shaded while those that have not can be lighted. The number of cards 304 in play can be shown. The numbers that have been pre-drawn and shown on the Bonanza board 302 can be displayed on the player unit 102 through the client software 104 while those that have not are still displayed on the cards 304.

Figure 4:
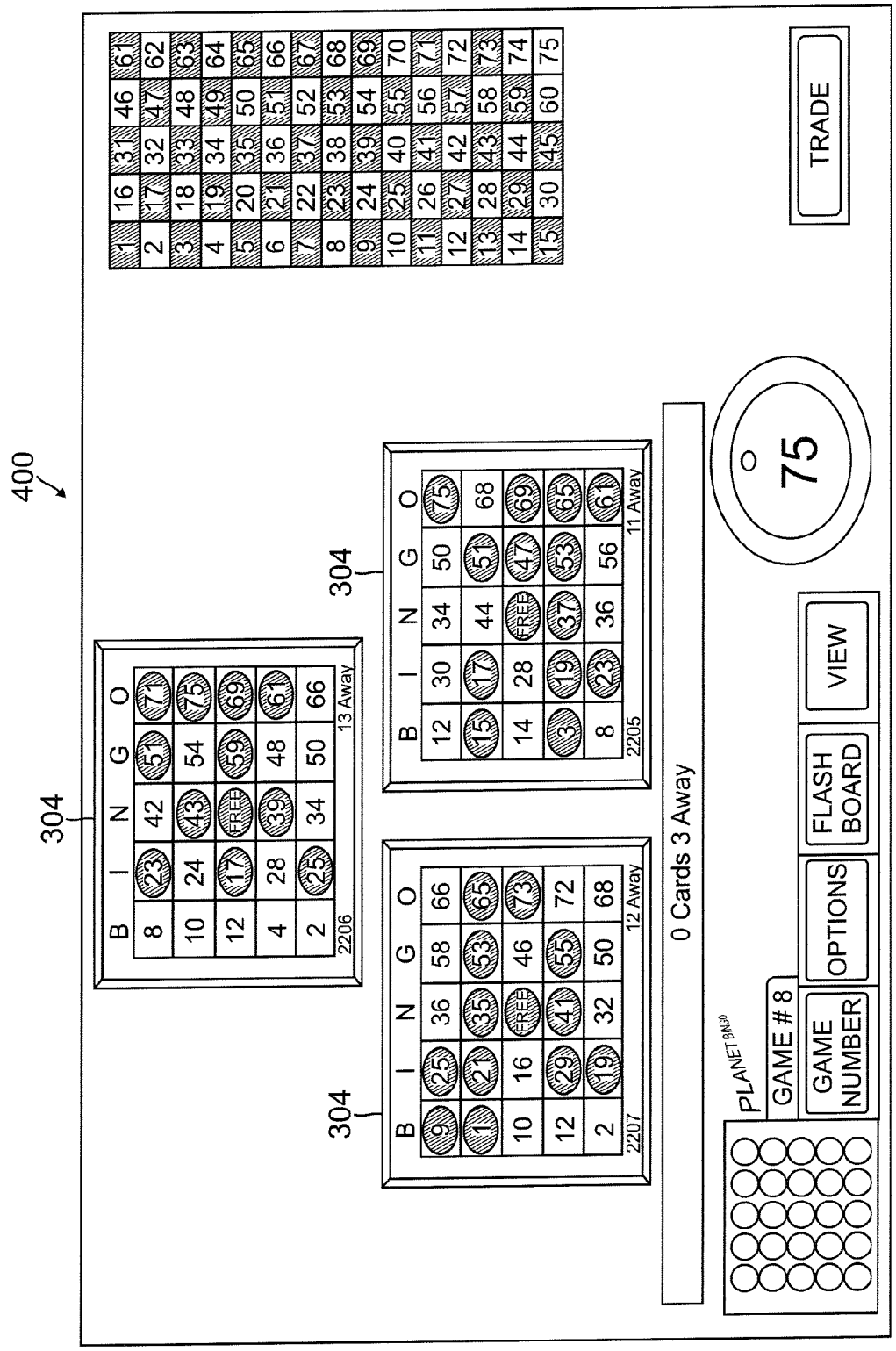
FIG. 4 is an exemplary screen shot showing sorted cards in accordance with one or more aspects of the present disclosure.

When a corresponding response from the server 106 confirms availability of a "Bonanza Trade" and available funds, a Trade Button can be offered. In one embodiment, the Bonanza cards 304 can be automatically scored and sorted. For example, the cards 304 can be sorted from worst to best or best to worst using a software sorting algorithm, for example a Bubble Sort algorithm. FIG. 4 is an exemplary screen shot 400 showing sorted cards 304 in accordance with one or more aspects of the present disclosure. Through this, the player can easily identify and select the worst card to quickly trade.

Figure 5:
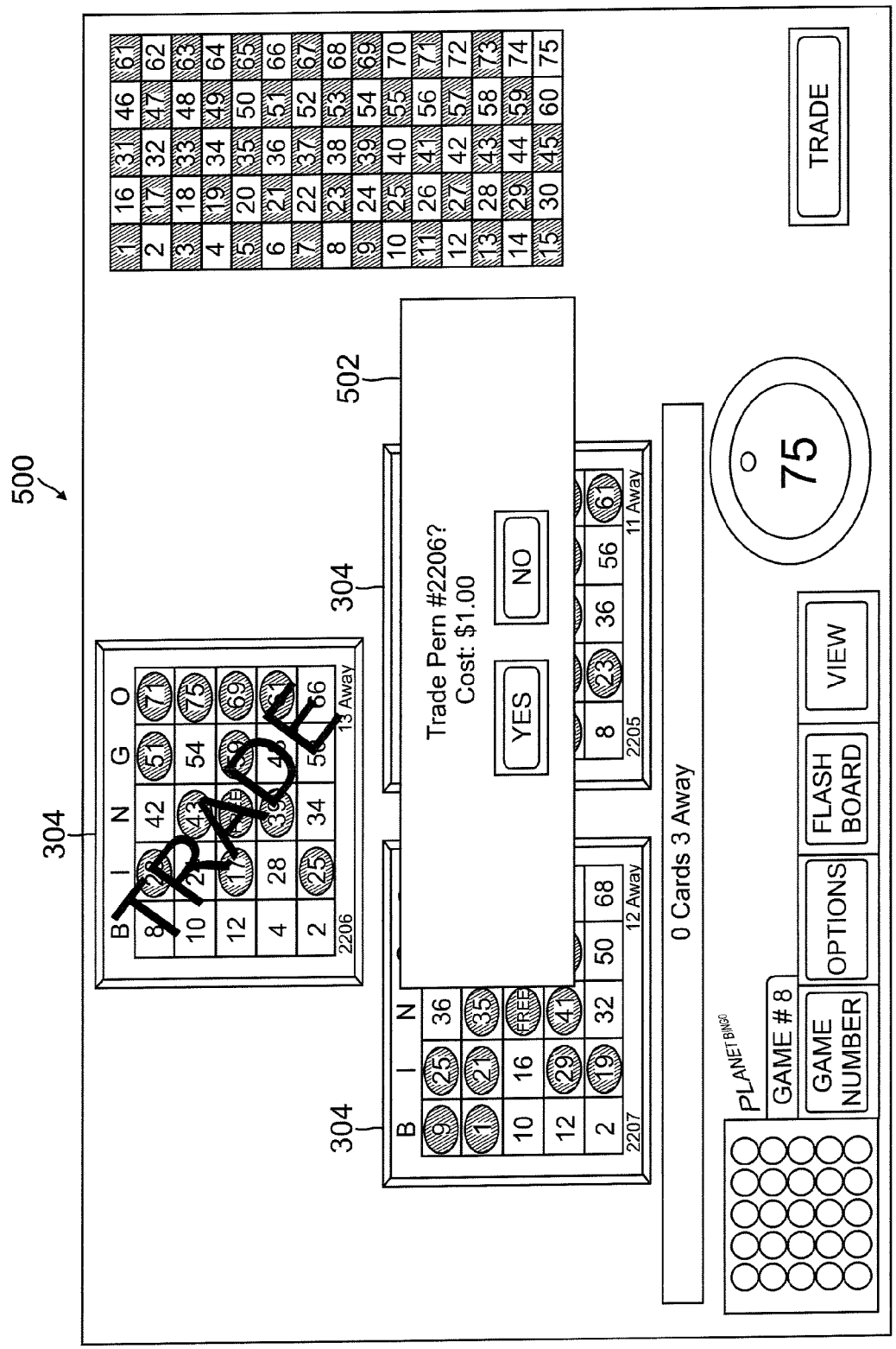
FIG. 5 is an exemplary screen shot permitting a trade when available in accordance with one or more aspects of the present disclosure.

FIG. 5 is an exemplary screen shot 500 permitting a trade when available in accordance with one or more aspects of the present disclosure. When a card 304 is selected by the player for a trade, there is a configuration prompt 502 by the game informing the player about the card 304 intended for the trade and the price associated with it. After the player confirms the trade action, a message goes out to the server 106 from the player unit 102. This message can include account, unit, session, game, and permutation identifications.

Generally, the server 106 can ensure the security of the transaction by validating the account, unit, session, game, permutation identifications as well as the available funds of the player. If invalid information is detected by the server 106, it can send out an error message to the client software 104, which can inform the player with an error prompt about the reason of the failed transaction. For example, a message of "Insufficient Funds" can be provided if there is not enough funds within the player's account or "Bonanza Card Already Traded" if the selected permutation has already been traded. If the selected permutation cannot be traded or is invalid, "Bonanza Card Not Available For Trade" can be displayed on the player unit 102. When the information is valid but the system 100 is out of permutations, then a corresponding error message, "No More Perms Available", can be provided to the client software 104 on the unit 102.

Figure 6:
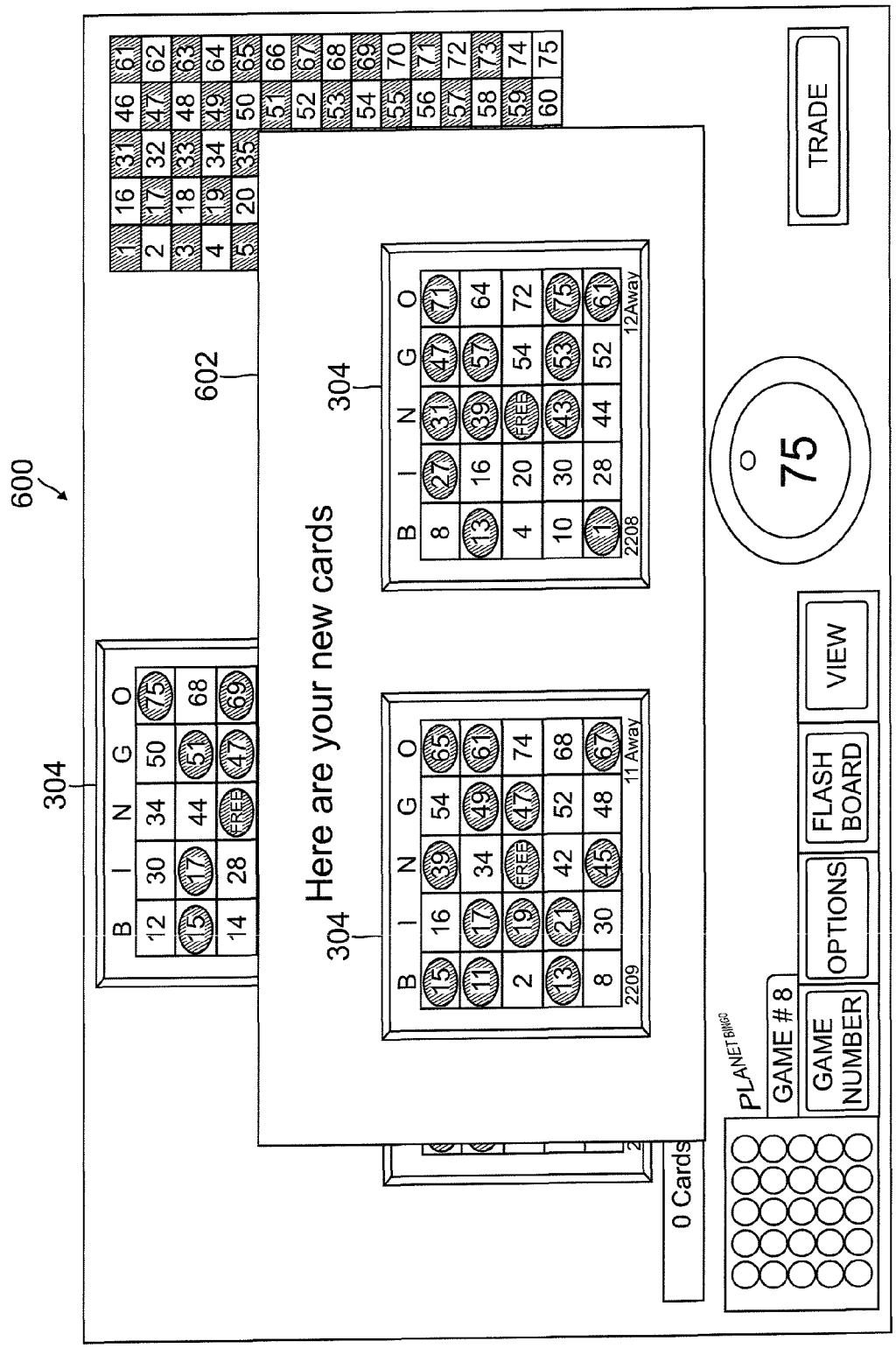
FIG. 6 is an exemplary screen shot displaying new cards in accordance with one or more aspects of the present disclosure.

Returning to decision block 206 of FIG. 2, the server 106 can allocate a new card 304 at block 210. If the information in the requested message is valid, the server 106 can allocate new cards 302 from a permutation pool for the trade. The permutation pool can be stored in the database 108. At block 212, those cards allocated by the server 106 can be precluded for future use. The balance of the player can be adjusted at block 214. FIG. 6 is an exemplary screen shot 600 displaying new cards 304 in accordance with one or more aspects of the present disclosure. If the network is down during the transaction, the player unit 102 can show an error message, for example, "Timed Out While Waiting For Response". Otherwise, a completion prompt 602 can show the new cards 304. The processes can end at block 218.

For purposes of illustration, the above-described processes can be used to trade one set of "n" bingo card(s) 304 for another set of "m" number of different bingo card(s) 304. "n" can represent any whole number from 1 and up depending on business rules set by the bingo hall, casino or charity. "m" can be any whole number from 1 and up depending on business rules set by the bingo hall, casino or charity. Traded cards 304 can be available for further trades for the same Bonanza game based on set business rules. In one embodiment, the trade can offer the player the ability to take a daubed Bonanza card 304 that was purchased, add a dollar and get two new Bonanza 304 cards in exchange.

Security for the processes described in FIG. 2 can be confirmed using account, unit, session and game identifications as well as a 32 bit CRC check in the application protocol. Reliability is achieved by means of request-response framework of the messages. Accuracy can be accomplished by redundant checking of the availability of the trade option and funds and validity of permutation identifications. Usability can be implemented by introducing automatic scoring and card sorting.

In one embodiment, the system 100 can also be a thick client where game logic and cards reside on the client. Money validation can take place on the server or on the client as well. A thick client can be downloaded that can provide a unique "block" of cards that would not be duplicated by any other client. Duplicates would not be in play at the same time for the same game at that entity. All trades can be done on the unit/client and later sent to a verification server so that cards can be verified. In one embodiment, the verifier unit can have all the card and verification data for cards in the set prior to the game. The cards are never sent to the server until the end of the session for reporting.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A game server comprising:
   at least one processor;
   a database for storing a plurality of electronic bingo cards; and
   a memory operatively coupled to said at least one processor, said memory storing program instructions that when executed by said at least one processor, causes said processor to: provide at least one electronic bingo card to a player unit; receive a trade request from said player unit; validate said trade request; provide at least one new electronic bingo card to said player unit in exchange for the at least one electronic bingo card when validated;
   mark said at least one new electronic bingo card within said database precluding other player units from accessing said at least one new electronic bingo card; wherein said memory storing program instructions when executed by said processor causes said processor to: mark said at least one new electronic bingo card within said database precluding other player units from accessing said at least one new electronic bingo card; wherein said memory storing program instructions when executed by said processor causes said processor to: pre-call bonanza bingo numbers; and provide said bonanza bingo numbers to said player unit.

2. The game server of claim 1, wherein said game server communicates with said player unit through a network.

3. The game server of claim 1, wherein said memory storing program instructions when executed by said processor causes said processor to mark said at least one electronic bingo card within said database precluding other player units from accessing said at least one electronic bingo card.

4. The game server of claim 1, wherein said player unit is portable or fixed.

5. The game server of claim 4, wherein providing said Bonanza Bingo numbers to said player unit comprises broadcasting or multicasting said Bonanza Bingo numbers.

6. The game server of claim 1, wherein validating said trade request comprises authenticating an account, unit session, game, permutation and fund of said player unit.

7. The game server of claim 1, wherein said memory storing program instructions when executed by said processor causes said processor to provide an error message to said player unit when said player unit is invalid.

8. The game server of claim 7, wherein said error message comprises at least one of insufficient funds, cards already traded, cards not available for trade and no permutations available.

9. The game server of claim 1, wherein said memory storing program instructions when executed by said processor causes said processor to process transactions for said player unit and store information about said transactions in said database.

10. The game server of claim 1, wherein validating said request comprises determining whether said request is within a defined time frame.

11. In a user device having a display screen and a graphical user interface (GUI), a method for trading Bonanza Bingo game cards through said GUI of said display screen, said method comprising:
    displaying at least one Bonanza Bingo game card from a game server on said GUI on a player terminal;
    requesting from the player terminal at least one new Bonanza Bingo game card from said server in exchange for the one bonanza bingo game card;
    providing account information from the player terminal to said server;
    receiving said at least one new Bonanza Bingo game card from said server when said server validates said account information;
    displaying said at least one new Bonanza Bingo game card on said GUI; marking the at least one new bonanza bingo game card to preclude other player unit from accessing it; and pre-calling bonanza bingo numbers; and provide said bonanza bingo numbers to said player unit by the server.

12. The method of claim 11, wherein validating said account information by said server comprises determining whether said at least one new Bonanza Bingo game card has been used.

13. The method of claim 11, wherein validating said account information by said server comprises determining whether a user associated with said user device has funds.

14. The method of claim 11, comprising providing a permutation for said at least one new Bonanza Bingo game card to said server for validation.

15. The method of claim 11, comprises receiving two or more new Bonanza Bingo game cards wherein said two or more new Bonanza Bingo game cards are displayed on said GUI of said display screen from worst-to-best or best-to-worst.

16. A system comprising:
    at least one user agent playing at least one Bonanza Bingo game card;
    a game server connected to said at least one user agent providing said at least one Bonanza Bingo game card, wherein said game server receives a request from said at least one user agent for at least one new Bonanza Bingo game card in exchange for the at least one bonanza bingo game card, authenticates said at least one user agent and provides said at least one new Bonanza Bingo game card to said at least one user agent;

mark said at least one new bonanza bingo card within said system precluding other user agent from accessing said at least one new bonanza bingo card;

the system pre-call bonanza bingo numbers; and provides said bonanza bingo numbers to said user.

17. The system of claim 16, wherein said game server confirms an availability of said at least one new Bonanza Bingo game card.

18. The system of claim 16, wherein said game server adjusts a balance of said at least one user agent.

* * * * *